Oct. 4, 1966     T. R. DRAKE     3,276,211

DRY DOCK

Filed Jan. 27, 1964     3 Sheets-Sheet 1

INVENTOR.
THEODORE R. DRAKE
BY
AGENT

Oct. 4, 1966
T. R. DRAKE
3,276,211
DRY DOCK
Filed Jan. 27, 1964
3 Sheets-Sheet 2
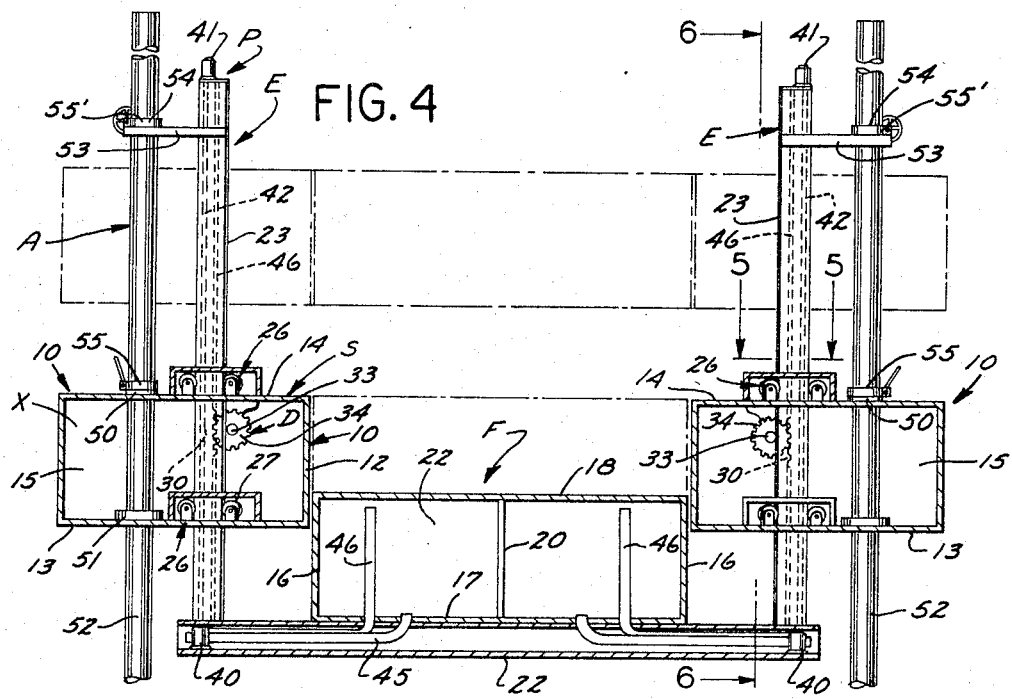
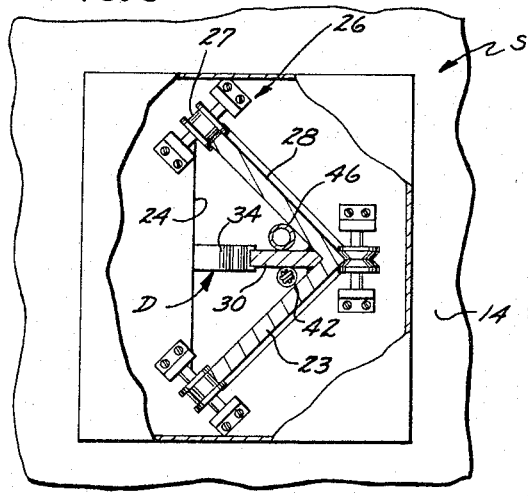
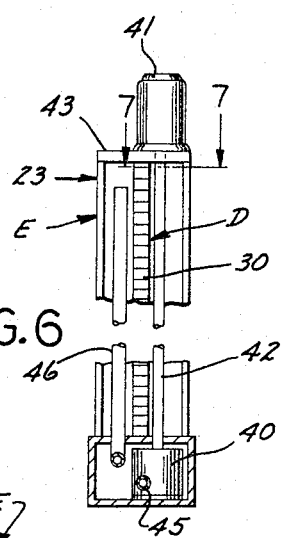
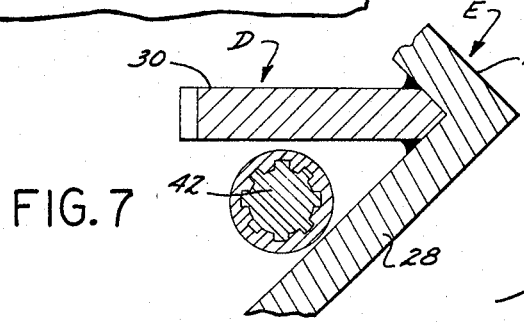
INVENTOR.
THEODORE R. DRAKE
BY
AGENT

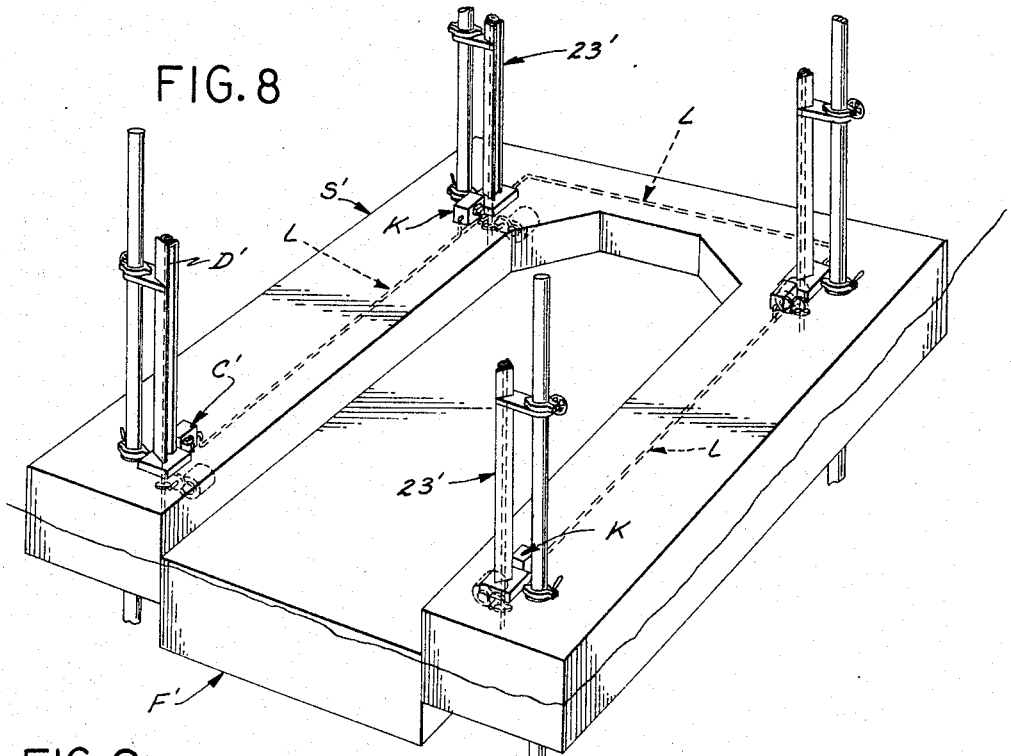
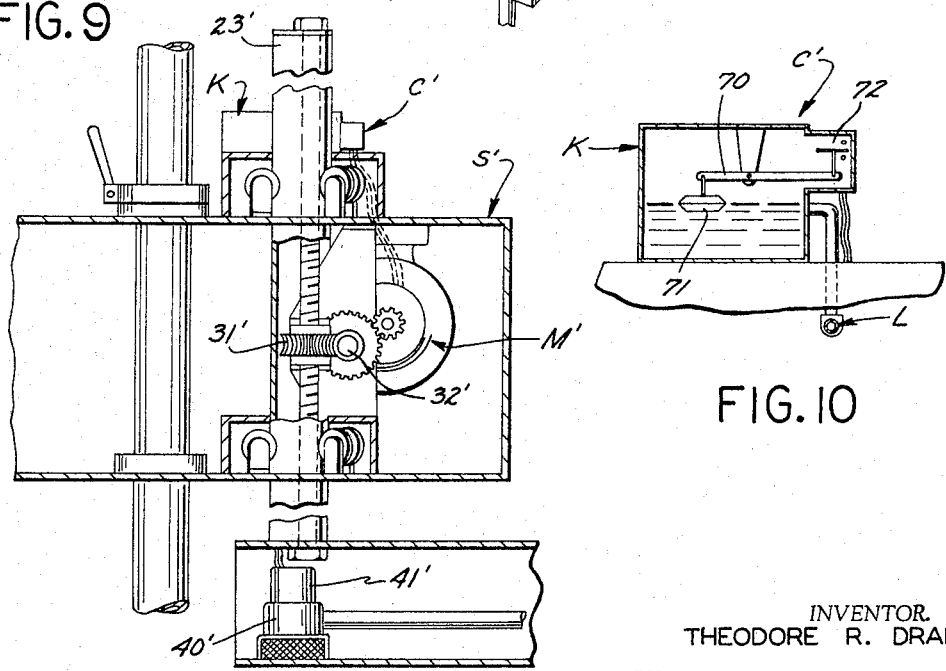

United States Patent Office 3,276,211
Patented Oct. 4, 1966

3,276,211
DRY DOCK
Theodore R. Drake, P.O. Box 875, Seal Beach, Calif.
Filed Jan. 27, 1964, Ser. No. 340,165
4 Claims. (Cl. 61—46.5)

This invention relates to a dry dock and is more particularly concerned with an improved floating and/or seagoing dry dock construction.

An object of the present invention is to provide a combination slip and dry dock construction for receiving seagoing vessels and operable to lift or elevate the vessels from the water, as circumstances require.

Another object of this invention is to provide a slip and dry dock construction including a buoyant, U-shaped slip to occur at the opposite sides and at one end of a vessel and a central, submersible float to occur below the vessel in the slip and adapted to be selectively raised and submerged to raise and lower the vessel within the slip.

Still another object of the present invention is to provide means between the slip and the float whereby the float, and a vessel supported thereon, is stabilized by the slip as it is raised and lowered.

Still another object of my invention is to provide a structure of the character referred to wherein the float is constructed to define a plurality of longitudinally and laterally-spaced chambers and wherein means is provided for each chamber to flood the chamber with water or evacuate water from the chamber so as to submerge and float the float and so as to effectively trim the float, slip and vessel related thereto.

Still another object of the present invention is to provide a novel construction of the character referred to wherein the means coupling the slip and the float is operable to mechanically urge the float below the surface of the water by exerting the weight of the slip thereon.

A further object of the present invention is to provide means on the slip for releasably engaging the bottom of the body of water on which the construction is floated to anchor the construction in fixed position on the water and including a plurality of vertically shiftable pilings carried by the slip.

Still another object of this invention is to provide means operatively coupling the pilings with the said means coupling the slip and float whereby the weight of the slip and/or the float can be exerted on the pilings to urge them into the bottom and whereby the buoyancy of the slip and/or the float can be exerted on the pilings to withdraw them from engagement in said bottom and to elevate the said pilings.

Still another object of the present invention is to provide a slip and dry dock construction of the character referred to wherein the slip can be dry-docked or elevated out of the water by the float and wherein, the slip being thus elevated, it can be supported by the pilings or by barges and the float subsequently elevated out of the water, thereby dry docking the entire construction for the purpose of maintenance and repair.

It is an object of this invention to provide a dry dock construction of the character referred to which is not limited to size and capacity, which is easy and economical to manufacture and which is easy and convenient to maintain and operate.

The various objects and features of my invention will be fully understood from the following detailed description of typical preferred forms and applications of my invention, throughout which description reference is made to the accompanying drawings, in which:

FIG. 4 is a sectional view taken as indicated by line 4—4 on FIG. 2;

FIG. 5 is a sectional view taken as indicated by line 5—5 on FIG. 4;

FIG. 6 is a view taken as indicated by line 6—6 on FIG. 4;

FIG. 7 is a sectional view taken as indicated by line 7—7 on FIG. 6;

FIG. 8 is a diagrammatic perspective view of another form of my invention;

FIG. 9 is a detailed sectional view taken as indicated by line 9—9 on FIG. 8;

FIG. 10 is a view of a part of the structure shown in FIG. 8.

Figure 1:
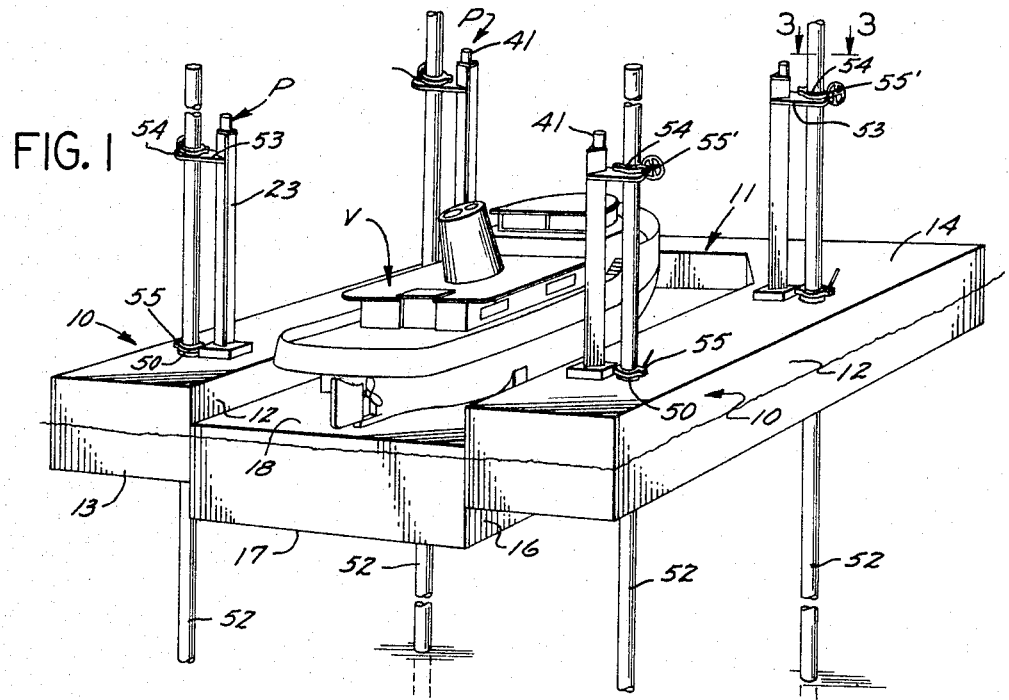
FIG. 1 is a perspective view of my new dry dock showing a vessel related thereto.

The dry dock construction provided by the present invention includes generally, a U-shaped pontoon or floating slip S, a float F arranged within the slip, pump means P for varying the buoyancy and for trimming the float, elevator means E for driving the float vertically relative to the slip and anchoring means A carried by this slip and adapted to maintain the construction stationary on the water's surface.

The slip S is an elongate, horizontally-disposed U-shaped structure having front and rear ends, a pair of like elongate laterally-spaced parallel leg portions 10 and a transversely extending header portion 11 fixed to and extending between the forward ends of the legs 10.

The slip S is a unitary tank-like structure formed of steel, or timber and has flat vertically-disposed side walls 12 about its entire perimeter, a flat horizontally-disposed bottom 13 and a flat horizontally-disposed top or deck 14.

In addition to the foregoing, the slip S is provided with a plurality of bulkheads 15 establishing a plurality of water-tight compartments or chambers.

The float F is a simple, substantially rectangular shaped tank-like structure formed of steel or timber. The float F, like the slip S, has vertically-disposed side walls 16, a bottom 17 and a flat horizontally-disposed deck 18. The slip S is substantially equal in longitudinal and lateral extent with the longitudinal extent of and distance between the legs 10 of the slip and is arranged to normally occur within the space defined by the slip, with working clearance.

The float F is further provided with a central longitudinal bulkhead 20 and one or more longitudinally-spaced lateral bulkheads 21 dividing the interior of the float into left and right and forward and rear water-tight chambers or compartments 22.

The number of bulkheads and resulting chambers and compartments in the slip and the float can be varied as circumstances require and is governed or determined by the size of the dry dock construction.

Figure 2:
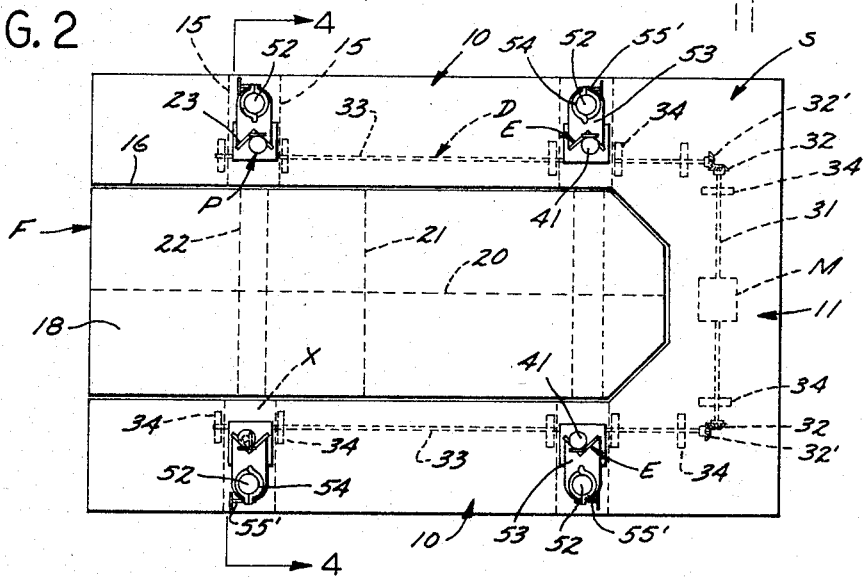
FIG. 2 is a plane view of the dry dock construction provided by the present invention.
Figure 3:
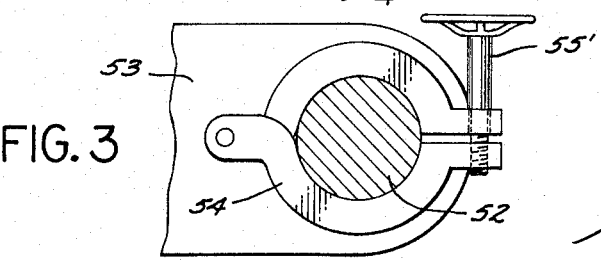
FIG. 3 is a sectional view taken as indicated by line 3—3 on FIG. 1.

The elevator means E in the form of the invention shown in FIGS. 1 to 7 includes two or more elongate horizontally-disposed, transverse beams 22 fixed to the bottom of the float in longitudinal spaced relationship therewith and projecting from the opposite sides thereof to occur below the bottoms of the leg portions 10 of the slip S. The means E further includes an elongate, vertically-disposed column 23 fixed to and projecting upwardly from each end of the beams, through pairs of registering openings 24 in the bottoms and decks of the leg portions of the slip S. The openings 24 occur between pairs of longitudinally-spaced bulkheads 15 in the leg portions of the slip, which partitions define chambers X through which the columns extend and in which water can freely flow.

The beams 22 are steel box sections and the columns 23 are angle sections. The columns 23 are arranged to open laterally inwardly and with their corners disposed laterally outwardly and have their lower ends fixed to the end portions of the beams 22 related thereto as by welding.

At each opening 24, I provide a suitable bearing means 26 for the column 23 related thereto. The bearing means 26 includes three roller bearings 27 fixed to the slip construction and engaging the edges of the flanges 28 of the angle columns and the corners of said columns, as clearly illustrated in FIGS. 4 and 5 of the drawings.

It will be apparent that each column 23 is supported and guided by two vertically-spaced bearing means 26 and is prevented from shifting or pivoting out of normal alignment with the slip thereby.

In addition to the foregoing, the elevator means E further includes drive means D for mechanically raising and lowering the assembly made out of the float, beams and columns, relative to the slip.

In the first form of the invention, the drive means D includes an elongate vertically-disposed rack 30 fixed to and extending longitudinally of each column 23, a reversible prime mover M in the header portion 11 of the slip S, a driveshaft 31 rotatably supported in the header portion of the slip to extend transversely thereof and having a drive bevel gear 32 at each end, a driveshaft 33 extending longitudinally of each arm portion 10 of the slip and having a driven bevel gear 32' at its forward end in driving engagement with the bevel gears 32 and drive pinions 34 on the shafts 33 engaged with each rack 30. The shafts 31 and 33 extending through the slip construction are rotatably supported by suitable pillow blocks or bearings 34 fixed to the slip construction.

The bearings 34 for the shafts 33 are shown carried by the bulkheads 15 in the slip, through which the said shafts project and in practice are provided with suitable sealing means to seal between the bulkheads and the shafts.

In the case illustrated, the racks 30 are arranged within the confines of the angle section columns 23 and are fixed thereto, at the junction of the flanges 28 thereof, as by welding and so that they project inwardly therefrom, as clearly illustrated in the drawings.

With the means D set forth above, it will be apparent that the float F can be urged upwardly and downwardly relative to the slip S by the mechanical means, as circumstances require. It will be further apparent that the means E and D serve to lock the slip and float in fixed relationship with each other, when the means D is not in operation and that when in operation it drives the several columns 23 synchronously and in such a manner as will prevent warping, twisting and/or binding of the construction.

The pump means P for varying the buoyancy of the float F and for trimming the dry dock construction includes a pump 40 for each chamber 22 in the float. The pumps 40 are reversible pumps and are adapted to pump water into and out of the float chambers 22 to which they are related to vary the buoyancy and the trim of the float F. Since the float F is coupled with the slip in such a manner as to prevent misalignment of the float relative to the slip, trimming of the slip is also accomplished by trimming the float.

The pumps 40 of the means P are submersible pumps, there being one pump 40 within each end portion of the beams 22 extending transverse the lower side of the float. The pumps 40 are arranged in axial alignment with the columns 23 related thereto and a prime mover 41, preferably an electric motor, is provided at the upper end of each column and is operatively coupled with the pump at the lower end of the column by a suitable driveshaft 42 extending longitudinally of the column. In practice the motor 41 is mounted on a suitable mounting plate 43 at the top of the column with which it is related and the driveshaft 42 extends longitudinally of the column, within the confines of the flanges 28 thereof and adjacent one side of the rack 30 arranged therein, as clearly illustrated in the drawings. The driveshaft is guided and supported by suitable bearings (not shown).

It is to be understood that the prime movers 41 can be suitable interval combustion engines, and that I have illustrated electric motors for the purpose of convenience.

The pumps 40, arranged within the beams 22, which beams are, as pointed out above and as illustrated in the drawings, box sections, have inlet and outlet openings disposed laterally-outwardly towards their adjacent ends of the beams and have flow pipes 45 coupled therewith to extend laterally inwardly through the beams and thence upwardly to communicate with the chambers 22 of the float related thereto, as clearly illustrated in FIG. 4 of the drawings.

The means P that I provide further includes a vent pipe 46 which pipe extends from the upper end of the column 23 related to the chamber, downwardly to the beam related thereto, thence laterally inwardly through the beam and thence upwardly into the chamber 22, to terminate in the upper portion thereof.

The portions of the vent pipes 46 extending longitudinally of the columns 23 are arranged within the confines of the flanges 28 thereof and occur at the side of the rack 30 therein, opposite the drive shaft 42, as clearly illustrated in FIGS. 5, 6 and 7 of the drawings.

With the pump means provided by the present invention, it will be apparent that the several longitudinal and laterally-spaced chambers 22 of the float F can be flooded with water, or evacuated of water so as to vary the buoyancy of the float, as well as to trim or level the float and the slip related thereto, as circumstances require.

In practice, suitable control means C can be provided to automatically put the several pumps of the means P into and out of operation and to maintain the construction trim. Such a means is illustrated in FIGS. 8 and 10 of the drawings and will be later described.

The upper end of each column is provided with a laterally-outwardly-projecting platform 53 with a bearing 54 to normally slidably engage or receive the upper end of the piling 52 related to the column.

The means A further includes manually operable clamping means related to or incorporated in each of the bearings 50 and 54 to releasably engage and hold the pilings 52.

In the case illustrated, I have indicated the bearings 50 on the slip deck 14 as having separate manually operable clamps 55 related thereto to engage the pilings and have shown the bearings 54 on the platforms at the upper end of the columns being split sleeve type bearings with segments pivotally connected together and secured to the platform at one side and provided with hand wheel operated screw means 55' at their other sides to urge the sections thereof into and out of clamped engagement with the pilings.

Since the type of clamping means can vary widely in practice without affecting the novelty of the present invention, I have chosen to illustrate an extremely simple form of clamp means with the understanding that any suitable form of clamping means can be employed.

In operation, the float F is initially empty of water and is, by its buoyancy and by operation of the means E positioned with its deck 18 flush with the deck 14 of the slip S. The pilings 52 are normally up, where their lower ends project a limited distance below the bottom 13 of the slip and are clear of the bottom of the body of water on which the dock construction is floated. The pilings are held up by the clamps 55 and/or the clamp-type bearings 54.

The construction is then floated or moved through or across the water to a location where it is desired to be used. When thus located, it can be anchored in position by means of the anchoring means A and/or by means of conventional marine anchoring equipment.

If the means A is to be used, the clamps engaging the pilings are released and the pilings 52 are allowed to drop into engagement in the bottom of the body of water. To assure that the pilings are suitably engaged in the said bottom, the clamps or clamp-type bearings 54 at the upper ends of the columns are made tight, the float F is flooded by means of the pumping means D and the elevator and drive means E and D are operated to urge the float downwardly relative to the slip, thereby exerting the weight of the entire construction on the pilings and urging them into said bottom. When the pilings are thus engaged, the clamps 54 are released and the construction is ready for use.

The float F being flooded, is lowered further by means E until the deck 14 thereof is below the surface of the water a sufficient distance to clear the bottom of the vessel V which is to be dry docked.

The vessel V is then sailed into the slip S and properly oriented therein by means of lines L extending from the vessel to the columns 23.

The means E is then operated to elevate the float F into engagement with the bottom of the vessel V. At the same time, water in the float F is evacuated therefrom by the means P.

In this fashion, the float F is made buoyant and is elevated to lift the boat or vessel out of the water.

If desired, suitable blocks 60 can be provided to steady the vessel on its keel, which rests on the deck 18 of the float F, however, since the lines L used to orient and hold the vessel in position in the slip, are mode fast to the columns 23, which move with this float, a single setting of the lines L is all that is required and as a result, the need of blocks can normally be dispensed with.

If the construction is not provided with a control means C for the means P, as mentioned above, and due to the distribution of weight in the vessel, or if due to improper positioning of the vessel on the float F the dry dock construction is tipped, it can be righted and trimmed by flooding certain of the chambers 22 in the float F with a necessary amount of water.

Since the float F is coupled with the slip so as not to allow for misalignment therebetween, the slip serves to stabilize the float and the vessel thereon, thereby providing an extremely stable set-up.

In practice, the vessel can be raised and lowered out of and into the water as often as necessary or desired by simply flooding and evacuating the chambers 22 of the float by the means P and by operation of the means E. Each such operation can be accomplished in a matter of minutes by a single man.

When it is desired to move the construction and disengage the pilings 23, the float F is submerged to its lowermost position and the clamps 54 are made tight on the pilings. Thereupon the float is evacuated of water and the means E is operated to raise the float, thereby pulling the pilings from engagement in the bottom and lifting them to their upward or normal position.

The float F is of sufficient buoyancy, when empty, to support the slip S clear of the water.

When it is desired to work on the bottom of the slip, the float is lowered by flooding and operation of the means E. The water is then pumped from the float and the float rises, lifting the slip clear of the water, where it is convenient to work on.

If it is desired to work on and repair the bottom of the float, the slip is elevated clear of the water in the manner set forth above. Barges are then floated beneath the slip and the float is then elevated clear of the water by the means D.

Another manner in which the dry dock can be dry docked is to first set the pilings in the manner set forth above, then elevate the slip in the manner set forth above, then make the clamps 55 tight on the pilings to hold the slip in fixed position on the pilings, clear of the water, then elevate the float clear of the water by the means D.

By simply reversing the above steps the construction can be floated again.

In practice, suitable generator plants, machine shops and offices, can be established in the hull of the slip S, thereby making it unnecessary to obstruct the deck of the slip with such facilities.

In FIGS. 8 and 9 of the drawings, I have shown a modified form of the invention, wherein the drive means D' includes an elongate vertically disposed, stationary screw fixed to and extending longitudinally of each column 23', a ring gear 31' engaged about each screw and mounted in the slip for free rotation and against axial shifting relative to the screw, a worm gear 32' related to and driving each ring gear and a prime mover M' with a reduction transmission driving each worm gear.

The several prime movers M' are preferably electric motors and are driven synchronously so that ring gears are driven longitudinally of the screws uniformly and so that the float F' is shifted uniformly relative to the slip S'.

In practice, the motors M' can be reversible, or the reduction transmission can include a suitable reversing mechanism, as desired.

The means C referred to above and diagrammatically illustrated in FIGS. 8 and 10 of the drawings, is adopted to control the operation of the several pump means C' so that as the construction is operated, the several chambers in the float F' are flooded with water or water is evacuated therefrom in such a manner as to maintain the construction in trim.

The means C is shown as including an elongate vertically disposed fluid container K at each corner of the slip and a fluid line L extending about the slip and communicating with the several containers. The containers are in a common horizontal plane and the line L connects with the lower ends of the containers.

The line L and containers K are filled with water.

A rocker arm 70 is pivotally mounted on each container at a point intermediate the ends of said rocker arm and has a float 71 at one end, engaged in the water in the container and is connected at its other end with a three position switch 22 connected with the reversible pump motor 41' on the adjacent column 23'. The switch has a central off position, an upper on position to energize the motor related thereto in one direction and to evacuate water from the float chamber related thereto and a lower on position to energize the water in the opposite or other position and to flood the said chamber.

With the means C' set forth above, it will be apparent that when the dry dock construction is operated, the construction is automatically maintained trim.

In practice, the motors 41' and pumps 40' can be one direction motors and pumps and suitable valve means, either manually operable or under control of an automatic control means, such as the means C', can be related to the inlet and outlet sides of the pump and/or the chambers to effect the reversal of flow into and out of the chambers, without departing from the spirit of the invention.

Further, in the second form of the invention now under consideration, the pumps 40' are driven by submersible electric motors 41'. With such a construction, the pumps 40' need not be arranged in axial alignment with the columns and the driveshafts 42 and their necessary supporting bearings, provided in the first form of the invention, can be eliminated.

Having described only a typical preferred form and application of my invention, I do not wish to be limited to the specific details herein set forth, but wish to reserve to myself any variations or modifications that may appear to those skilled in the art and fall within the scope of the following claims:

Having described my invention, I claim:

1. A dry dock including, an elongate U-shaped floating slip, an elongate float within the confines of the slip, pump means to flood and evacuate the slip with water to vary the buoyancy thereof, elevator means connected between the slip and the float to shift the float vertically relative to the slip and including a plurality of elongate vertical racks projecting upwardly from the float and motor-driven pinions on the float and engaging the racks, and anchoring means to engage in the earth beneath a body of water on which the dry dock is floated including, a plurality of vertically shiftable pilings carried by the slip and clamp means on the float engaging the pilings to releasably hold them against vertical shifting relative thereto and releasable clamp means at the upper ends of the racks above the slip to engage and shift the pilings vertically with the float and relative to the slip.

2. A dry dock including, an elongate U-shaped floating slip, an elongate float within the confines of the slip pump means to flood and evacuate the float to vary the buoyancy thereof and elevator means connected between the slip and the float to shift the float vertically relative to the slip, said elevator means including a plurality of longitudinally and laterally-spaced columns projecting upwardly from the float, bearing means on the slip slidably receiving and guiding the columns and drive means carried by the slip and engaging the columns to urge the columns and the float vertically relative to the slip, and anchoring means to engage the earth beneath a body of water on which the dry dock is floated including, a plurality of vertically shiftable pilings carried by the slip, clamp means carried by the slip to releasably engage the pilings and clamp means at the upper ends of the columns to releasably engage the pilings.

3. A dry dock including, an elongate U-shaped floating slip, an elongate float within the confines of the slip, pump means to flood and evacuate the float to vary the buoyancy thereof and elevator means connected between the slip and V and having a plurality of longitudinally and laterally-spaced compartments, pump means adapted to selectively flood and evacuate water from the several compartments in the float to trim and vary the buoyancy of the float and elevator means connected with the slip and the float to guide and shift the float vertically relative to the slip, said elevator means including a plurality of longitudinally and laterally-spaced columns projecting upwardly from the float, bearing means on the slip slidably receiving and guiding the columns to urge the columns and the float vertically relative to the slip, and anchoring means to engage the earth beneath a body of water on which the dry dock is floated including, a plurality of vertically shiftable pilings carried by the slip, clamp means carried by the slip to releasably engage the pilings, and clamp means at the upper ends of the columns to releasably engage the pilings.

4. A dry dock including, an elongate U-shaped floating slip, an elongate float within the confines of the slip and having a plurality of longitudinally and laterally-spaced compartments, pump means adapted to selectively flood and evacuate water from the several compartments in the float to trim and vary the buoyancy of the float and elevator means connected with the slip and the float to guide and shift the float vertically relative to the slip, said elevator means including a plurality of longitudinally and laterally-spaced columns projecting upwardly from the float, bearing means on the slip slidably receiving and guiding the columns and drive means carried by the slip engaging the columns to urge the columns and the float vertically relative to the slip, and anchoring means to engage the earth beneath a body of water on which the dry dock is floated including, a plurality of vertically shiftable pilings carried by the slip, clamp means carried by the slip to releasably engage the pilings, and clamp means at the upper ends of the columns to releasably engage the pilings, said pump means including a pump at the lower end of each column, a prime mover at the upper end of each column and operatively connected with said pump, a flow duct extending from the pump into the lower end of one of said chambers in the float, and a vent pipe extending from the upper portion of said chamber to the upper end of said column.

References Cited by the Examiner

UNITED STATES PATENTS

| | | | |
|---|---|---|---|
| 47,501 | 4/1865 | Turner | 114—48 |
| 1,335,497 | 3/1920 | Hamilton | 61—65 |
| 2,775,869 | 1/1957 | Pointer | 61—46.5 |
| 2,942,425 | 6/1960 | Delong | 61—46.5 |
| 3,011,467 | 12/1961 | LeTourneau | 61—46.5 X |

OTHER REFERENCES

Haftung et al.: German printed application, No. 1,120,918, December 12, 1961.

CHARLES E. O'CONNELL, *Primary Examiner.*

JACOB SHAPIRO, *Examiner.*